United States Patent [19]

Keith et al.

[11] 4,171,288

[45] Oct. 16, 1979

[54] CATALYST COMPOSITIONS AND THE METHOD OF MANUFACTURING THEM

[75] Inventors: Carl D. Keith, Summit; William R. Larsen, Fords; Thomas Shimrock, Chatham, all of N.J.

[73] Assignee: Engelhard Minerals & Chemicals Corporation, Iselin, N.J.

[21] Appl. No.: 836,649

[22] Filed: Sep. 23, 1977

[51] Int. Cl.² .................. B01J 21/04; B01J 23/10; B01J 23/64; B01J 23/74
[52] U.S. Cl. .................. 252/462; 252/466 B; 252/466 PT; 423/213.5
[58] Field of Search ............ 252/462, 466 PT, 466 B; 423/213.5

[56] References Cited

U.S. PATENT DOCUMENTS

| | | | |
|---|---|---|---|
| 3,840,471 | 10/1974 | Acres | 252/466 B |
| 3,939,104 | 2/1976 | Campbell et al. | 252/455 R |
| 3,993,572 | 11/1976 | Hindin et al. | 252/462 |
| 4,006,103 | 2/1977 | Meguerian et al. | 252/466 B |

*Primary Examiner*—W. J. Shine

[57] ABSTRACT

Catalysts are disclosed which have good activity and life when used to promote the conversion of hydrocarbons, carbon monoxide and nitrogen oxides contained in small concentrations in gaseous streams, to obtain the less noxious materials, carbon dioxide, water and nitrogen. The catalysts contain a catalytically promoting, platinum group metal component, a catalytically promoting, base metal component and an alumina support component, deposited on a high surface area, particulate, macrosize carrier. The base metal component contains a metal selected from the group consisting of metals having an atomic number from 25 to 28 and rhenium.

31 Claims, No Drawings

CATALYST COMPOSITIONS AND THE METHOD OF MANUFACTURING THEM

The present invention relates to catalytic structures which contain catalytically-promoting, platinum group metal and base metal components, and an alumina support component, deposited on a high surface area, particulate macrosize carrier. The catalysts exhibit good activity and life when used to promote, for example, the conversion of hydrocarbons, carbon monoxide and nitrogen oxides even when contained in minor concentrations in gaseous streams. The catalysts are preferably formulated in order that they are capable of promoting these conversions simultaneously, at least under controlled reaction conditions. The products of the reactions are primarily carbon dioxide, water and nitrogen which are relatively innocuous when discharged into the atmosphere. The catalytic structures contain one or more platinum group metals and preferably contain at least platinum. When the catalysts are intended to promote the herein-described simultaneous conversion of hydrocarbons, carbon monoxide and nitrogen oxides most effectively, they may contain platinum or palladium, especially platinum, preferably along with one or more of rhodium, ruthenium and iridium, especially rhodium, as a platinum group metal component. The catalysts of the invention also contain one or more base metals selected from the group consisting of metals having an atomic number from 25 to 28 and rhenium, e.g., nickel, and an alumina support component. These components are deposited on a high surface area, particulate carrier which is preferably an activated alumina. The catalytic materials are concentrated in the outer surface layer of the catalysts and, therefore, are readily accessible to the materials to be reacted in contact therewith. Also the catalytic material is strongly adherent to the high surface area, particulate carrier. The catalysts exhibit good attrition resistance which is an important feature since the catalytically-promoting metal components of the catalysts are concentrated in the outer portions of the catalyst particles where attrition would occur.

The catalytic treatment of various gaseous streams containing minor amounts of materials which are considered to be atmospheric pollutants such as hydrocarbons, carbon monoxide and nitrogen oxides has been practiced on a commercial basis for a number of years. It is desired to convert these pollutants to the less noxious materials, carbon dioxide, water and nitrogen. Generally, the gaseous streams which are treated are effluent or waste gas streams which are discharged into the atmosphere in large quantities, and a salient example of such treatments is the high temperature contact of the exhaust gases of internal combustion engines with a catalyst containing a platinum group metal component. Initially, most attention was directed on a commercial basis to the oxidation of the hydrocarbon and carbon monoxide components of the gaseous streams, and generally the treating system contained an excess of oxygen based on complete combustion of these components to carbon dioxide and water. Since the catalysts employed also had a capability of promoting reduction reactions, there may have occurred during the treatment some reduction of nitrogen oxides into nitrogen and/or ammonia, although the presence of the latter material in the products is undesirable.

A number of exhaust gas-treating systems containing a plurality of catalysts have been proposed, and the operations often involve the use of one catalyst under reducing conditions to maximize the conversion of nitrogen oxides to nitrogen, and a separate catalyst is employed under oxidizing conditions to maximize the conversion of carbon monoxide and hydrocarbons to carbon dioxide and water. Such systems are expensive and, therefore, undesirable, particularly where the amount of space available for containing the catalytic equipment is limited as is usually the case with automotive vehicles. However, as time passes the levels of pollutants that may be charged acceptably into the atmosphere are being lowered to the extent that both the oxidation of carbon monoxide and hydrocarbons and the reduction of nitrogen oxides must be accomplished to a high degree if government regulations are to be satisfied. It is, therefore, quite important to develop catalytic systems for treating such gases most effectively and under economically attractive conditions.

The physical and chemical relationships which exist in catalysts can be defined to a considerable extent, yet the performance characteristics of catalysts frequently depend on the manner in which a catalyst is made, even though a significant or controlling physical or chemical distinction of the resulting catalyst cannot readily be established. This is especially the case when the catalysts contain a plurality of catalytically-promoting metal components admixed with one or more support components which are apparently associated in ways which are undefined to a significant extent. Such catalysts may be used to promote several reactions simultaneously, and the desirable catalyst characteristics must be maintained when the catalysts are attempted to be made by different procedures.

The art has become aware that the foregoing described oxidation and reduction can be conducted simultaneously by using a single catalyst system to treat the contaminated gases while maintaining the fuel to molecular oxygen ratio in the gaseous stream at, or close to, the stoichiometric amount needed to convert the hydrocarbon and carbon monoxide components to carbon dioxide and water, while taking into account the amount of oxygen made available by the reduction of nitrogen oxides to nitrogen. Catalysts which can operate at high temperatures over long periods of time while maintaining good activity for promoting the desired oxidation and reduction reactions simultaneously are of great interest and are, or will shortly become, in great demand, particularly such catalysts that maintain a high degree of both oxidation and reduction activity under the strenuous and erratic conditions to which catalysts are subjected while treating internal combustion engine exhaust gases.

Catalysts which are intended to be used in treating combustion exhaust gases must operate satisfactorily under severe conditions that include high temperatures and gas velocities, varying reaction conditions, frequent heating and cooling, and mechanical stress, at least in the case of treating automotive vehicle exhausts. On a commercial basis the structural forms of such catalysts have for the most part been macrosize and of two types, i.e., monolithic and particulate. Especially with the monolithic catalysts, the uncoated walls of the monolithic carrier often have a relatively low total or specific surface area of less than about 20 square meters per gram, BET; and such surface area is frequently less than about 1 or 2 square meters per gram. These structures exhibit low pressure drop characteristics, high geometric surface areas and good chemical stability at high temperatures, but when made of ceramics they are often brittle and subject to mechanical damage. Also, the manner of housing catalysts of this type is a significant expense if the housing be adequate to insure that the catalyst will be useful over long periods of operation. The monolithic catalysts usually contain their catalytically-active components disposed in a refractory oxide coating of, for instance, alumina on the monolith walls, and there must be strong adherence between the carrier and the coating if the catalysts are not to become ineffective due to the loss of the surface-positioned, catalytically-active material.

The foregoing and other aspects of monolithic catalysts have caused commercial practices to include the use of particulate or pelleted catalysts. These materials generally comprise a relatively high specific or total surface area support, such as activated alumina, in which is contained the catalytically-promoting metal component. During use the catalyst particles are disposed as a fixed bed of contiguous particles which may exhibit a relatively high pressure drop. Relative and abrasive movement among the particles due to contact with high velocity gases which have surging flow, as well as, mechanical vibrations, may cause the catalysts to experience high attrition rates. As a result, surface-disposed catalytic promoters could be removed from the catalyst and exit the system with the exhaust gases or cause an increase in the pressure drop. Consequently, successful catalysts of this type have been made by disposing the catalytic promoters more or less throughout the support in order to insure high activity even when the outer surfaces of the particles are removed. This disposition of the catalytic promoters can be accomplished by, for instance, impregnating the formed support, or its unformed, finely divided precursor, with an aqueous solution of the catalytically promoting components. Since these catalysts generally contain a platinum group metal component, much of this expensive component is thus disposed within the inner portions of the catalyst pellets and is relatively unavailable to the reactants undergoing treatment.

In the present invention it has been found that particulate catalysts of excellent activity and stability, both chemical and physical, capable of promoting the conversion in substantial quantities of the hydrocarbon, carbon dioxide and nitrogen oxide comtaminants of exhaust gases to non-polluting materials, i.e., carbon dioxide, water and nitrogen, can be made by including a platinum group metal component and a base metal component containing one or more member selected from the group consisting of metals having an atomic number from 25 to 28 and rhenium, on an alumina support component, and at least ultimately depositing these materials on a high surface area, particulate, macrosize carrier. The catalysts of the present invention contain one or more platinum group metal components, preferably at least platinum. When the catalysts are intended to promote the simultaneous conversion of hydrocarbons, carbon monoxide and nitrogen oxides most effectively, they may contain one or both of platinum and palladium, especially platinum, and preferably one or more of rhodium, ruthenium and iridium, especially rhodium, as well as the base metal component, and an alumina support component, e.g., high surface area alumina, which components are deposited on the high surface area, particulate, macrosize substrate. Such preferred catalysts can be formulated to be capable of promoting the simultaneous and substantially complete conversion of hydrocarbons, carbon monoxide and nitrogen oxides present in gaseous streams to less noxious materials as described herein, but without producing significant amounts, if any, of hydrogen sulfide, sulfur trioxide or sulfuric acid in the effluent from the treating system.

In accordance with the present invention, catalysts can, preferably, be made by intimately admixing one or more components selected from the group consisting of metals having an atomic number from 25 to 28 and rhenium, and one or more platinum group metal components with a solid alumina support component before any of these components is deposited on the particulate, macrosize carrier. One or more platinum group metal components may be added to the macrosize carrier having deposited thereon as a mixture one or more of the base metal components and an alumina component, or one or more of the base metal components may be added to the macrosize carrier having deposited thereon as a mixture one or more platinum group metal components and an alumina component. When there are multiple additions of platinum group metal components or base metal components, one of such type of component may be added to the alumina support component before the latter is placed on the macrosize carrier and another of such type of component then added to the composite. Also, an alumina support component may, but is not preferably, added to the macrosize carrier before the alumina support component is combined with any platinum group metal or base metal components, and then such catalytically-promoting components added. Preferably, a platinum group metal component and a base metal component reactive with the platinum group metal component are not combined before either component is contacted with the alumina support component.

The platinum group metal component may be combined with the support by contacting the support in solid, finely-divided form with a liquid containing therein a compound of at least one platinum group metal. The base metal component may be combined with the support by at least one of (1) admixing finely divided particles of a solid compound of at least one base metal with the solid, finely-divided alumina support and (2) contacting the support with a liquid containing therein a compound of at least one base metal, which liquid may be the same or different from that which contains the compound of the platinum group metal.

It is a distinct feature of the present invention, that the alumina support component be deposited on the macrosize, particulate carrier by contact of the latter with dispersed particles of liquid admixed with finely-divided, solid, particles of the alumina support component, with or without one or more of the platinum group metal components, and/or one or more of the base metal components, to be included in the catalysts. Such dispersions can be formed by spraying, or otherwise dispersing, the corresponding liquid containing the solid support particles into air or other gaseous medium, and the dispersion contacts the macrosize, particulate carrier of the compositions to be formed. Preferably, the liquid phase of the liquid-solid mixture is aqueous. In contrast to when the macrosize, carrier particles are contacted with the corresponding, but undispersed, liquid-solid mixture, the use of a dispersed form results in a relatively uniform, non-sticky coating on the carrier particles. Apparently, the absorptive nature of the carrier particles causes the liquid portion of the dispersed material to be drawn into the carrier particles thereby depositing the solid particles of the mixture as a thin, relatively dry and non-sticky coating on the surfaces of the carrier particles. During coating the carrier particles can, for instance, be disposed in the form of a compact bed in which the particles undergo mixing or movement with respect to each other while being coated with the dispersed liquid and solid-containing particles, and the rate of addition of the mixture is such that the carrier particles remain essentially free flowing during the operation. For example, the carrier particles may be coated as they cascade along a face of the compact bed. If such coating is attempted by more or less immersing the carrier particles in the liquid or otherwise contacting them with the liquid-solid mixture in the form of a continuous liquid phase, the surfaces of the carrier particles remain wet and they tend to form one or more agglomerated masses of solids and liquid which are difficult, if not impossible, to handle in a convenient or economical fashion to provide the ultimately desired, solid catalyst particles. Typically, in making the catalysts of this invention the coating of the carrier particles with the alumina support component can be accomplished by using a liquid-solid mixture in which the solid support particles are to a major extent in the size range of up to about 10 microns. Contact of the carrier particles with the dispersed particles of liquid and solid can be continued until the desired amount of coating is deposited on the carrier particles without encountering any significantly undesirable tendency of the particles to agglomerate.

In accordance with this invention the compositing of the catalytically promoting, platinum group metal component and a finely divided alumina support component can, preferably, be accomplished by contacting a liquid containing a soluble or dispersed form of a catalytically-promoting, platinum group metal with the alumina solids. If desired, a finely-divided material containing a base metal of the catalyst may already have been divided with either a platinum group metal component or a finely divided alumina support component before the latter are combined. Preferably, essentially all of the liquid of the platinum group metal solution or dispersion is absorbed by the solids, and the solution or dispersion is generally aqueous in nature. If in dispersion form, the particle sizes of the platinum group metal component are preferably colloidal, although in the preparative system of this invention particles of somewhat larger size may be adequately dispersed. The solution may contain one or more water-soluble, platinum group metal compounds, e.g., a basic compound or an acidic compound such as chloroplatinic acid, palladium chloride, ruthenium chloride, iridium chloride or rhodium nitrate. The dispersion may contain particles having, at least for the most part, sizes below about one micron such as a platinum sulfide sol. Highly suitable composites can be made by combining the alumina support component with both a basic platinum compound and an acidic compound of another platinum group metal such as rhodium, ruthenium or iridium. Separate compounds of the catalytically-promoting platinum group metals may be added to the support in one or more aqueous solutions or dispersions to provide one or more platinum group metals on given support particles.

In the catalysts of this invention, the platinum group metal component is present in a minor, catalytically-effective amount sufficient to provide compositions having significantly enhanced catalytic activity and preferably contains platinum. The useful platinum group metals include, for instance, platinum, ruthenium, palladium, iridium and rhodium, and mixtures or alloys of such metals, e.g., platinum-ruthenium, platinum-rhodium, palladium-rhodium, platinum-rhodium-iridium or platinum-palladium-rhodium. The amount of platinum group metal is a minor portion of the catalyst, and generally does not materially exceed about 5 weight percent. For instance, the amount may be about 0.01 to 4%, and is preferably about 0.02 to 1%. It is preferred that the platinum group metal component of the catalysts contains more than one of such metals, and be composed of a major amount of one or both of platinum and palladium, especially platinum, and preferably along with a minor amount of one or more of ruthenium, iridium and rhodium, especially rhodium. For example, this component of the catalyst may have about 55 to 98 weight % of total platinum and palladium, and about 2 to 45 weight % of total other platinum group metal, e.g., total ruthenium, iridium and rhodium, based on the total of all of these metals. Catalysts of the best activity and whose performace characteristics have less dependence on the presence of the base metal oxide component, contain a weight ratio of total platinum and palladium to total rhodium, ruthenium and iridium of about 2 to 5:1, and as this ratio increases the importance of the base metal oxide component increases. Due to the cost and limited availability of rhodium, ruthenium and iridium, the ratio used is often about 8 to 30:1. The ratio of platinum to rhodium in a preferred embodiment is approximately 95/5 Pt/Rh. Since this ratio is approximately that in which platinum and rhodium are found in South African ore, there are commercial advantages to using a 95/5 ratio. The ore or mine ratio of Pt/Rh/Ir is approximately 19/1/0.2 and this ratio of metals may be advantageously employed. It may be desireable to increase the amount of rhodium present by a factor of about two, e.g., use a ratio of about 20 Pt/2 Rh/0.3 Ir. The catalysts containing one or both of platinum and palladium and one or more of rhodium, ruthenium and iridium, along with the base metal component, are particularly useful for promoting the simultaneous conversion of hydrocarbons, carbon monoxide and nitrogen oxides to less noxious materials. The foregoing amounts of the catalytically-promoting platinum group metals are stated on the basis of the metals regardless of the form in which they are present in the catalysts, and are based on the total, dry weight of the catalysts, including the particulate, macrosize carrier.

When the catalytically-promoting, platinum group metal component is in solution form and is combined with the alumina support, this catalytically-promoting metal component may be fixed on the support, i.e., converted to essentially water-insoluble form, and preferably this may be done while the composite is maintained essentially devoid of unabsorbed liquid medium. The conversion may be effected by treatment with a gas such as hydrogen sulfide or hydrogen, or with a liquid such as acetic acid or other agents which may be in liquid form, especially an aqueous solution, e.g., a hydrazine or other reducing solution. The amount of liquid used, however, is preferably not sufficient for the composite to contain any significant or substantial amount of unabsorbed liquid during the fixing of the catalytically-promoting, platinum group metal on the support. The fixing treatment may be with a reactive gas or one which is essentially inert, for example, the fixing may be accomplished by calcining the composite in air or other gas which may be reactive or essentially inert with the catalytically promoting, platinum group metal component. The resulting insoluble or fixed, catalytically promoting, platinum group metal component may be present as a sulfide, oxide, elemental metal, alloy or in other form. Rather than add the platinum group metal component as one or more solutions, a dispersion of a relatively insoluble form of the catalyst promoter may be used, e.g., an aqueous platinum sulfide sol. Preferably, the liquid of the dispersion is aqueous.

The catalysts of the invention contain one or more base metal components selected from the group of metals having atomic numbers from 25 to 28 (manganese and the iron group metal, i.e. nickel, iron and cobalt) and rhenium. In making the catalysts, one or more of the catalytically promoting, base metal components are combined with the alumina support. These catalytically promoting metal components may be in liquid, or solid form when combined with the alumina support component. Thus the base metal component may be added to an alumina support component as an aqueous solution of a water-soluble metal compound or in solid form such as an oxide. In the latter case the solid alumina and base metal components are preferably in finely-divided form. The base metal component may be an oxygen-containing compound which decomposes to an oxide at elevated temperatures and which does not unduly adversely affect the catalytic or other desirable properties of the materials present. Suitable decomposition temperatures include those which are encountered during drying, calcination or use of the catalyst. When combined with the other components of the catalyst, the base metal component may be in elemental or alloy form, and may be used as such or converted, at least in part, to an oxide form during use or calcination or other treatment of the catalyst at elevated temperatures in the presence of an oxygen-containing gas. The base metal component when added as a solid may be in a form which is substantially insoluble in the liquids present during the manufacture of the catalyst, and the use of substantially water-insoluble forms of the metals is a preferred operation. Although the solid added may be essentially soluble in the liquid present during manufacture of the catalysts, it is preferred that a major amount of the total base metal selected from the group having an atomic number from 25 to 28 and rhenium when provided in the catalyst as a solid, does not become dissolved throughout the preparation of the catalyst, i.e., during or after being combined with the alumina support. These catalytically-promoting metal components mixed with the alumina support may be in oxide, hydroxide, acetate, formate, carbonate, tungstate, titanate, phosphate, silicate or other organic or inorganic form. Nickel is a preferred metal, and it may be present along with, for example, minor amounts of cobalt, manganese or other components based on the total of these metals. Mixtures of cobalt and manganese components may also be preferred base metal components. The catalysts of this invention may contain other materials such as other base metal components.

The total of the metals having atomic numbers from 25 to 28 and rhenium in the catalysts of this invention is generally a minor portion of the catalyst, and the amount is sufficient to provide a desired catalytically-promoting effect during the use of the catalyst. Such amounts may depend on the choice of metal and the intended use of the catalyst, and the amounts are generally at least about 0.1 or 0.5 weight % of the catalyst. These amounts may be up to about 10% or more, and preferably, the amounts are about 1 to 6%. The amounts of this catalytically-promoting metal component are stated on a metal basis regardless of the form in which the metal is present in the catalysts, and are based on the total, dry weight of the catalysts, including the macrosize carrier. Often the total amount of these base metals present in the catalyst is greater than the platinum group metal, for instance in a weight ratio of at least about 2:1, preferably at least about 5:1, say up to about 25:1 or more.

Generally, the alumina support, at some point after the step of contacting it with the liquid or liquids containing the platinum group metal compound and/or the base metal compound is heated, as shown in the Examples, at a temperature sufficiently high to provide on the support the desired platinum group metal component and, when the base metal compound is so contacted, the base metal component.

The alumina support component of the catalysts of this invention contains a major amount of one or more finely divided aluminum oxide forms as an essential component. It is preferred that the alumina be predominantly in activated or calcined form such as gamma, delta, or eta alumina, and the support may have a relatively high total or specific surface area, e.g., at least about 50 square meters per gram as determined by the BET procedure. The support may preferably be in such form when combined with the base metal or platinum group metal components. More highly hydrated aluminas may also be employed as the support material, and may be converted to less hydrous, activated forms during calcination or use. The alumina support component may contain a minor amount of one or more ingredients other than alumina, such as refractory oxides, e.g., silica or metal oxides such as chromia, zirconia, titania and the like. The alumina support may be in a mixed or combined oxide form such as silica-alumina, aluminosilicates which may be amorphous or crystalline, alumina-zirconia, alumina-chromia, alumina-ceria and the like. The refractory oxide may be dried or calcined at an elevated temperature to provide a high total surface area material, e.g., preferably having a surface area of at least about 75 square meters per gram. The preferred supports are comprised substantially of heat-stabilized alumina which may result from high temperature calcination, e.g., at about 750° to 1200° C., in the presence of a minor amount, e.g., about 1 to 20 weight percent, of a stabilizing component such as $ZrO_2$, $TiO_2$, alkaline earth metal oxides such as barium, strontium or calcium oxide, or rare earth oxides, e.g., ceria, and lanthanum oxide, and their mixtures. The stabilizing components may also serve to minimize reaction between the base metals and alumina and thus decrease or avoid the formation of less active spinels. Most desirably, the amount of alumina in the support component of the catalysts is at least about 75% of the total weight of this component. The alumina support is a substantial portion of the material placed on the particulate, macrosize carrier and often is a major weight amount of such material. The alumina support component may, for example, comprise about 0.1 to 30, preferably about 2 to 20, weight percent of the catalyst. The support materials used in this invention include those which are often referred to as being in catalytically-active form, but any such activity is generally of a lower order compared with that of the catalytically-active, promoting platinum group metal and base metal components. The particle sizes of the major portion of the alumina support are often less than about 40 mesh, preferably less than about 325 mesh, when combined with the catalytically promoting base metal component. The sizes of the major portion of the refractory oxide support particles when so combined may often be above about 20 microns.

In making the catalysts of this invention it is preferred that the alumina support component and the base mtal component be comminuted together to provide a mixture in which the major portion of the solid particles may advantageously be of a size of up to about 10 or 15 microns. This operation can be conducted in the presence of a liquid phase, e.g., an aqueous liquid, and sufficient of the liquid may be present for it to be a continuous phase in the mixture, i.e., the mixture is a slurry. It is preferred that the mixture which is subjected to comminution contain one or more platinum group metals or their compounds, and thus the platinum group metal component can be combined with one or more of the alumina support component and the base metal component prior to undergoing comminution. Alternatively, or in addition, the platinum group metal component could be charged directly into the comminution device.

The comminution can be accomplished in a ball mill or other suitable equipment, and the solids content of the slurry may be, for instance, about 20 to 60 weight percent, preferably about 40 to 55 weight percent. The pH of the slurry is preferably below about 5, and acidity may be supplied by the use of a minor amount of a water-soluble organic or inorganic acid or other water-soluble acidic compounds such as salts. Thus the acid employed may be hydrochloric or nitric acid, or more preferably a lower fatty acid such as acetic acid, which may be substituted with, for example, chlorine as in the case of trichloroacetic acid. The use of fatty acids may serve to minimize any loss of platinum group metal from the support and minimize reaction of the base metal component with the support. The comminuted mixture is deposited on the particulate, macrosize carrier in making the catalysts of this invention.

In order to deposit the alumina support component on the particulate, macrosized carrier, the latter can be contacted with a slurry of the alumina support component or its composite with one or more of the catalytically promoting metal components. Thus the carrier may be contacted with a spray or other dispersed form of an aqueous slurry of the solids with intermediate drying if desired, until the appropriate amount of solids is placed on the carrier. The slurries employed in depositing the alumina support component on the carrier, with or without one or more of the catalytically-promoting metal components, will often contain about 20 to 60 weight percent of finely-divided solids, preferably about 35 to 55 weight percent.

In the catalysts of this invention the platinum group metal component-base metal component-alumina support composite is provided on the particulate carrier in a minor amount, for example, the composite may comprise about 0.2 to 35 weight percent of the dry, coated carrier, and is preferably about 3 to 25 weight percent. The components on the carrier are generally formed as a coating over most, if not all, of the surfaces of the carrier. The combined structure may be dried, and, if desired, calcined, e.g., at temperatures of at least about 250° C., preferably at least about 550° C., but not so high as to unduly destroy the surface area of the alumina support, unless such is desired in a given situation.

The particulate, macrosize carrier of the catalysts of this invention is generally a major amount of the combined catalyst structure, for instance about 65 to 98 or 99.8 weight percent, preferably about 75 to 97 weight percent, on a dry basis. The carrier is macrosize, i.e., at least one of its dimensions is at least about 1 millimeter, preferably at least about 2 millimeters. The pellet or particle form carriers have high surface areas, e.g., up to about 350 or more square meters per gram, although carriers having surface areas of up to about 150 or 200 square meters per gram are preferred. The particulate carrier may have a surface area of at least about 50 square meters per gram, preferably greater than about 75 square meters per gram, and preferably no dimension of the particles is larger than about 0.25 or 0.5 inch. Typically, all dimensions of the particles may be about 1/32 to ¼ inch.

The particulate carrier component of the catalysts of this invention contains one or more refractory oxide forms. Carriers having activated alumina as an essential constituent are preferred, and the carrier may be predominantly gamma, delta, or eta alumina. More highly hydrated aluminas may also be employed as the carrier, and may be converted to less hydrous forms during calcination or use. The carrier may be composed of one or more other components, e.g., silica or metal oxides such as chromia, zirconia, titania and the like. The carrier may be in a mixed or combined oxide form such as silica-alumina, aluminosilicates which may be amorphous or crystalline, alumina-zirconia, alumina-chromia, alumina-ceria and the like. The refractory oxide may be dried or calcined at an elevated temperature to provide the high total surface area material. The water pore volume of the carrier at ambient temperature is generally at least about 10 or 20%, and preferably is at least about 40%. The carrier may be comprised substantially of heat-stabilized alumina which may result from high temperature calcination, e.g., at about 750° to 120° C., in the presence of a minor amount, e.g., about 1 to 20 weight percent, of a stabilizing component such as $ZrO_2$, $TiO_2$, alkaline earth metal oxides, such as barium, calcium or strontium oxide, or rare earth oxides, e.g., ceria, and lanthanum oxide. Since, however, in the catalyts of the invention the base metal component need only be in the coating on the carrier, there may be little, if any need to provide a stabilizer in an alumina carrier for the purpose of avoiding spinel formation. Compared with conventional catalysts, the catalysts of the present invention may thus reduce the amount of stabilizer employed. Most desirably, the amount of alumina in the carrier component of the catalysts is at least about 75% of the total weight of the carrier.

The catalytic compositions made by the present invention can be employed to promote chemical reactions, such as reduction, methanations, steam reforming of hydrocarbons, and the oxidation of carbonaceous materials, e.g., carbon monoxide, hydrocarbons, oxygen and hydrogen-containing organic compounds, and the like to products having a higher weight percentage of oxygen per molecule such as intermediate oxidation products, carbon dioxide and water, the latter two materials being relatively innocuous materials from an air pollution standpoint. Advantageously, the catalytic compositions can be used to provide removal from gaseous exhaust effluents of uncombusted or partially combusted carbonaceous fuel components such as carbon monoxide, hydrocarbons, and intermediate oxidation products composed primarily of carbon, hydrogen and oxygen, or of nitrogen oxides.

Although some oxidation or reduction may occur at relatively low temperatures, these reactions are often conducted at elevated temperatures of, for instance, at least about 150° C., preferably about 200° to 900° C., and generally with the feetstock in the vapor phase. The materials which are subject to oxidation generally may contain carbon, and may, therefore, be termed carbonaceous. The catalysts are thus useful in promoting the oxidation of hydrocarbons, oxygencontaining organic components, and carbon monoxide, and the reduction of nitrogen oxides. These types of materials may be present in exhaust gases from the combustion of carbonaceous fuels, and the catalysts made by the present invention are useful in promoting the oxidation or reduction of materials in such effluents. The exhaust gases from internal combustion engines operating on hydrocarbon fuels, as well as other waste gases, can be oxidized by contact with the catalyst and molecular oxygen which may be present in the gas stream as part of the effluent, or may be added as air or other desired form having a greater or lesser oxygen concentration. The products from the oxidation contain a greater weight ratio of oxygen to carbon than in the feed material subjected to oxidation. Many such reaction systems are known in the art.

The catalysts made by this invention which contain one or both of platinum and palladium, especially platinum, and one or more of rhodium, ruthenium and iridium, especially rhodium, and a base metal component containing one or more metals having atomic numbers of 25 to 28 and rhenium are particularly useful in systems in which it is desired to conduct both oxidation and reduction simultaneously, for instance, to reduce nitrogen oxides while oxidizing carbon monoxide and hydrocarbons which may be present in the reaction system. In such catalysts the non-platinum group metal component may especially be nickel oxide, a combination of nickel oxide with a minor amount of cobalt oxide or manganese oxide based on the total amount of these oxides present, a combination of cobalt and manganese oxides, and the like. The amounts of platinum group metal and base metal present in such catalysts may be as indicated above. These simultaneous oxidation and reduction systems may be operated at temperatures of about 400° to 800° C., usually at about 450° to 700° C.

When the catalysts of this invention are used to reduce nitrogen oxides and at the same time oxidize hydrocarbons and carbon monoxide in engine exhaust gases, such operations can be conducted with the mixture undergoing treatment having an air to fuel ratio approximately the stoichiometric ratio, i.e., corresponding to approximately 14.65 (wt. basis) for the combustion of a hydrocarbon fuel with an average formula $CH_{1.88}$. Fuels with different carbon/hydrogen ratios may require slightly different air-fuel ratios to produce a stoichiometric mixture. To avoid confusion in making comparisons, the Greek symbol $\lambda$ has been used at times to present the relationship of a particular air-fuel ratio of a mixture to the stoichiometric ratio. The airfuel ratio is divided by the stoichiometric ratio so that in this system $\lambda = 1$ is a stoichiometric mixture, $\lambda > 1$ is a fuel-lean mixture, and $\lambda < 1$ is a fuel-rich mixture. For example, at an air-fuel ($CH_{1.88}$) ratio of 14.5, $\lambda = 14.5/14.65 = 0.9898$.

When using fresh catalysts of the present invention, often about 90–100 volume % of the contaminants, i.e., hydrocarbons, carbon monoxide and nitrogen oxides, may be converted to carbon dioxide, water and nitrogen by the polyfunctional catalysts containing platinum or palladium, rhodium, ruthenium or iridium, and base metal having an atomic number of 25 to 28 or rhenium when the system is operated at or near the stoichiometric air-fuel ratio. If a fuel-rich condition is used, the reduction of nitrogen oxides is favored, and if a fuel-lean condition is used, the oxidation of carbon monoxide and hydrocarbons is favored. Although these catalysts could be operated to remove primarily only one type of contaminant, it is a feature of the catalysts that they can convert all three contaminants to harmless compounds without producing hydrogen sulfide, sulfur trioxide or sulfuric acid to a significant, if any, extent from the sulfur in the fuel used in operating engines which are the source of the gases treated. This result can be obtained when the system is operated in a narrow range of air-fuel ratios or "window", close to the stoichiometric air-fuel ratio. Thus the contaminants can be substantially removed if the air-fuel ratio in the material treated by contact with the catalyst is about 14.2 to 14.9, preferably about 14.4 to 14.7, on an average basis and depending to a large extent on such factors as fuel composition. It is feasible to control the variations in air-fuel ratio accordingly. For example, the fuel supply system can be controlled by an oxygen sensor located in the engine exhaust gas at a position before the catalytic converter is reached. The normal variations of such a control system provide a continuous swinging of air-fuel ratio about the desired value, near the stoichiometric amount. The variations are small, however, and the average air-fuel ratio generally remains in the operating window, except for short periods of operation which may occur. Should a more significant excursion outside the operating window occur, the fresh catalysts will generally be capable of substantially completely converting whichever of the contaminants the conditions favor, that is, either nitrogen oxides when the air-fuel ratio is fuel-rich, or the carbon monoxide and hydrocarbons when the air-fuel ratio is fuel-lean. Another benefit of operating a polyfunctional catalyst of the invention with the air-fuel ratio controlled close to the stoichiometric value is that little, if any, sulfur trioxide or sulfuric acid is produced by oxidation of sulfur dioxide present in the exhaust gases, and little, if any, hydrogen sulfide is produced by reduction of the sulfur dioxide. A vehicle so equipped can be expected to meet government standards for sulfate emissions should such be established.

As the polyfunctional catalysts of the invention are used their capacity or activity for promoting a given reaction may decrease to some extent. It is preferred that such activity remain sufficient to convert at least about 60 or 70 volume % of the nitrogen oxide, hydrocarbon and carbon monoxide contaminants in exhaust gases to carbon dioxide, nitrogen and water. Since the amount of a given contaminant in the gases discharged to the atmosphere is the primary concern, acceptable performance may be obtained with catalysts of lesser activity when the feed gases are suitably low in the given contaminant. For example, in order to meet exhaust emission standards, the catalysts should retain over an acceptable period of operation, e.g., at least about 25,000 to 50,000 vehicle miles, substantial and sufficient activity to provide internal combustion engine exhaust gases whose components do not exceed about 3.4 grams/mile CO, about 0.41 gram/mile hydrocarbons, and about 2, or even 1, grams/mile nitrogen oxides when the gases subjected to treatment contain a significantly greater amount of a given component.

Embodiments of the present invention are illustrated by the following examples.

EXAMPLE 1

A platinum group metal-containing, ceria-alumina composite is prepared by mixing 400 grams of activated 5% $CeO_2$-95% $Al_2O_3$ powder (surface area about 110 with $m^2/gm$) with 280 ccs. of a platinum-containing aqueous solution made by adding sufficient deionized water to 14.1 grams of an aqueous platinum amine hydroxide solution containing 2.07 grams of platinum, to give 280 ccs. The resulting composite is mixed with the total aqueous rhodium nitrate solution made by diluting 1.19 grams of a rhodium nitrate solution (0.216 gm. Rh) with 20 ccs. of water. 30 cubic centimeters of glacial acetic acid is added to the mixture in which essentially all of the liquids are absorbed by the solids. The resulting powder has 90% in particle sizes of less than 40 microns, and primarily the sizes of the particles are above about 20 microns.

The platinum and rhodium-containing powder is ball-milled for 10.5 hours with 12 grams of cobalt oxide powder and 12 grams of manganese dioxide powder. The ball milling reduces the particle sizes of the mixture so that 90% is less than 10 microns in size. 35.5 grams of the ball-milled mixture is diluted with water to a total volume of 120 ccs. The diluted mixture is sprayed onto 216 grams of activated alumina spheres of about 5 to 8 mesh size, having a surface area of about 99 $m^2/gm$ and a water pore volume of about 60%. DUring coating the spheres are disposed as a cascading bed in a rotating vessel, and a coating of about 1 gram per cubic inch of spheres is formed on the latter. The coated spheres are dried at 120° C. to remove free water and calcined at 600° C. for 15 minutes to yield a polyfunctional catalyst (28 scp). The catalyst particles are tested for attrition characteristics by a standard procedure and have an acceptable weight loss of 2.9%.

EXAMPLE 2

Calcined, powdered ceria-alumina of the type described in Example 1 is impregnated with an ammoniacal solution containing nickel formate in just enough water to completely saturate the powder. Then, the wet powder is dried and calcined to form a 10.8% nickel oxide-ceria-alumina composite. The calcined powder (870 gm) is then impregnated with 600 ccs. of an aqueous platinum amine hydroxide solution formed by diluting 33.4 gm. of solution (4.91 grams of platinum) to 600 ccs. The mixture is then combined with 100 ccs. of an aqueous solution of rhodium nitrate formed by diluting 1.43 grams of rhodium nitrate solution (0.259 gm. Rh) to 100 ml. The precious metal solutions contain insufficient water to completely saturate the powder, and 40 milliliters of glacial acetic acid are added to and absorbed by the powder. The resulting composite is mixed with 200 ml. of deionized water, and the resulting slurry is then ball-milled for 16 hours to reduce the particle size to less than 10 microns. 36.9 grams of the ball-milled mixture are diluted to 120 ccs. and sprayed onto 203.5 gm. of activated alumina spheres of about 5 to 8 mesh size, having a surface area of 99 $m^2/gm$. and a water pore volume of about 60%. The spray coating is accomplished as described in Example 1. The coated spheres are dried at 110° C. to remove free water and calcined at 500° C. for 15 minutes to yield a finished polyfunctional catalyst (3 ssp.). In the standard attrition test the catalyst particles have an acceptable weight loss of 1.09%, and after heating for 24 hours at about 980° C., 1.89%.

EXAMPLE 3

The catalyst preparation of Example 2 is repeated, except using activated alumina spheres of 5 to 8 mesh size having a surface area of about 300 $m^2/gm$ and a water pore volume of about 54%. A final calcination temperature of 500° C. is employed. In the attrition test the spheres (3 scp-9) have a weight loss of about 2.5%, and, after heating for 24 hours at about 980° C., 31.5%. The initial spheres are relatively soft, having an attrition loss of 5.34% without heat treating.

EXAMPLE 4

The catalyst preparation of Example 2 is repeated, except using as the carrier silica-alumina cracking catalyst beads of about 5 to 6 mesh size, having a surface area of about 142 $m^2/gm$. and a water pore volume of about 50%. In the attrition test the beads (3 scp-10) have a weight loss of about 2.7%.

EXAMPLE 5

The catalyst preparation of Example 2 is repeated, except that the final calcination temperature is 600° C. In the attrition test, the spheres (3 scp-8) have a weight loss of 0.83%. The 600° C. calcination in this Example apparently improved the attrition resistance of the pellets.

EXAMPLE 6

A platinum group metal-containing, ceria-alumina composite is prepared by mixing 2000 grams of activated 5% $CeO_2$-95% $Al_2O_3$ powder (surface area about 128 $m^2/g$) with 1375 ccs. of a platinum-containing aqueous solution made by adding sufficient deionized water to 35.385 grams of chloroplatinic acid solution containing 14.1540 grams of platinum, to give 1375 ccs. The resulting composite is mixed with a rhodium nitrate solution made be diluting 7.8026 grams of a rhodium nitrate solution (1.4154 gm. RH) to give a total volume of 125 ccs., and essentially all of the liquids are absorbed by the solids. The resulting powder has 90% in particle sizes of less than 40 microns, and primarily the sizes of the particles are above about 20 microns.

One-third of the platinum and rhodium-containing powder is mixed with 35.1 grams of nickel oxide powder. The mixture is ball-milled along with 100 ml. of acetic acid, 25 ml. nitric acid and 400 ml. of water. The ball milling reduces the particle sizes of the mixture so that 90% is less than 10 microns in size. 64 grams of the ball-milled mixture is diluted with 126 ml. of water. The diluted mixture is sprayed onto 250 grams of activated alumina spheres of about 5 to 8 mesh size, having a surface area of about 120 $m^2/gm$. During coating the spheres are disposed as a cascading bed in a rotating vessel. The coated spheres are dried at 110° C. and calcined at 600° C. for 15 minutes to yield a polyfunctional catalyst (39 scp).

Catalysts of the above Examples may be tested for oxidation and reduction activity using a synthetic automobile engine exhaust gas containing, for example, 1.65% carbon monoxide, 13.5% carbon dioxide, 13.5% water, 0.9% oxygen, 0.55% hydrogen, 300 ppm hydrocarbons, 2000 ppm NO and the balance nitrogen (these amounts are all expressed on a volume basis). The synthetic exhaust gas is passed in contact with the catalyst at a series of air-to-fuel ratios (A/F), typically at 100,000 VHSV and inlet temperatures of about 500° C. and 650° C. After using the catalyst for 4 hours at 900° C. to convert the feed using an approximately stoichiometric air-feed ratio, the conversions for carbon monoxide, NO and hydrocarbons, as well as the percent ammonia produced from NO, at various A/F rates, are determined. For example, with respect to the catalyst of Example 1 the following results are obtained:

TABLE 1

| Run No. | Inlet Temp.°C. | A/F | Percent Conversion NO | CO | HC | Percent NH₃ From NO |
|---|---|---|---|---|---|---|
| 160 | 500 | 14.2 | 95 | 52 | 85 | 99 |
|  |  | 14.5 | 97 | 86 | 96 | 26 |
|  |  | 14.6 | 85 | 98 | 100 |  |
|  |  | 14.7 | 54 | 98 | 97 |  |
|  |  | 14.9 | 21 | 98 | 95 |  |
| 161 | 650 | 14.2 | 88 | 50 | 90 | 87 |
|  |  | 14.5 | 98 | 94 | 99 | 8 |
|  |  | 14.6 | 44 | 98 | 100 |  |
|  |  | 14.7 | 20 | 98 | 100 |  |
|  |  | 14.9 | 0 | 98 | 100 |  |

The foregoing described catalysts, and methods for their manufacture, according to this invention relate to compositions containing one or more catalytically-promoting platinum group metal and base metal components and an alumina support in a catalyst having a particulate, macrosize carrier. Other components such as catalytically-promoting metal components, refractory oxide supports, stabilizers and the like, may be added to the catalysts by various procedures, and the advisability of doing so may depend on several considerations, for instance, the cost of manufacture, or the nature, performance characteristics or other properties of the catalyst desired for use in a given situation.

It is claimed:

1. A catalyst composition having a catalytically-promoting material comprising an alumina support, a catalytically-promoting, base metal component, the base metal of which is selected from the group consisting of base metals having an atomic number from 25 to 28 and rhenium, and a catalytically-promoting, platinum group metal component, said catalytically-promoting material being deposited on a particulate, macrosize, solid carrier having a surface area of at least about 50 square meters per gram, and said base metal component being present in said catalyst composition in an amount greater than said platinum group metal component, said catalyst composition being prepared by combining said platinum group metal component, said base metal component, and said alumina support on said carrier, said platinum group metal component being combined with said support by contacting said support in solid, finely divided form with a liquid containing therein at least one compound of a platinum group metal, and said base metal component being combined with said support by at least one of (1) admixing finely divided particles of a solid compound of at least one base metal with said solid, finely divided alumina support and (2) contacting said support with a liquid containing therein at least one compound of said base metal, which liquid may be the same or different from that which contains said compound of said platinum group metal, heating said alumina support, after the aforesaid contacting with said liquid or liquids containing said platinum group metal and, optionally, said base metal compound or compounds, at a temperature sufficiently high to provide thereon said platinum group metal component and, optionally, said base metal component, forming a mixture of said solid, finely divided alumina support and a liquid, forming in a gaseous medium dispersed particles of said mixture containing said liquid and said solid, finely divided alumina support, contacting said dispersed particles with said particulate solid carrier to deposit said alumina support on said carrier, and drying said particulate carrier so coated with said alumina support.

2. The catalyst of claim 1 wherein said platinum group metal comprises one or both of platinum and palladium, and one or more of rhodium, ruthenium and iridium.

3. The catalyst of claim 2 in which platinum comprises the major amount of the platinum group metal.

4. The catalyst of claim 3 wherein said platinum group metal comprises platinum and rhodium.

5. A catalyst composition having a catalytically-promoting material comprising an alumina support a catalytically-promoting, base metal component comprising one or more of nickel, cobalt and manganese, and a catalytically-promoting, platinum group metal component, the platinum group metal of which comprises one or both of platinum and palladium and one or more of rhodium, ruthenium and iridium, said catalytically-promoting material being deposited on a particulate, macrosize, solid carrier having a surface area of at least about 50 square meters per gram, said base metal component being present in said catalyst composition in an amount greater than said platinum group metal component, said catalyst being prepared by combining said platinum group metal component, said base metal component, and said alumina support to provide a composite thereof, said platinum group metal component being combined with said support by contacting said support with a compound of a platinum group metal comprising one or both of a compound of platinum and a compound of palladium and one or more of a compound of rhodium, a compound of ruthenium and a compound of iridium, said compounds of platinum group metals being contained in a liquid during said contacting, and said base metal component being combined with said support by at least one of (1) admixing finely divided particles of solid compounds of one or more of nickel, cobalt and manganese with said support, and (2) contacting said support with a liquid containing therein a compound of one or more of nickel, cobalt and manganese which liquid may be the same as or different from that which contains compounds of the platinum group metals as aforesaid, heating said alumina support, after the aforesaid contacting with said liquid or liquids containing said platinum group metal and, optionally, said base metal compound or compounds, at a temperature sufficiently high to provide thereon said platinum group metal component and, optionally, said base metal component, and depositing the resulting composite on said carrier by forming a mixture of said solid, finely divided alumina support and a liquid, forming in a gaseous medium dispersed particles of said mixture containing said liquid and said solid, finely divided alumina support, and contacting said dispersed particles with said particulate solid carrier to deposit said alumina support upon said carrier, and drying said particulate carrier so coated with said alumina support.

6. A catalyst composition of claim 5 in which said base metal component comprises an oxide or an oxygen-containing compound which forms an oxide when thermally decomposed.

7. The catalyst of claim 5 in which platinum comprises the major amount of the platinum group metal.

8. The catalyst of claim 7 wherein said platinum group metal comprises platinum and rhodium.

9. A catalyst composition having a catalytically-promoting material comprising a finely-divided, solid stabilized, activated alumina support, a catalytically-promoting, finely-divided, solid base metal oxide comprising one or more of oxides of nickel, cobalt and manganese, and a catalytically-promoting platinum group metal component comprising rhodium and a major amount of platinum, said catalytically-promoting material being deposited on a particulate, macrosize, solid, carrier having a surface area of at least about 50 square meters per gram, said base metal oxide being about 0.5 to 10% of said catalyst on a base metal basis and present in an amount greater than said platinum group metal component, said catalyst being prepared by compositing said alumina support with said platinum group metal component and said base metal oxide to provide a composite thereof by contacting said support with a liquid containing therein a compound of rhodium and a compound of platinum, heating said alumina support, after the aforesaid contacting with said liquid containing therein said compound of rhodium and said compound of platinum, at a temperature sufficiently high to provide thereon said platinum group metal component, admixing finely divided solid particles of said base metal oxide with said support in an aqueous liquid to provide an aqueous slurry of the liquid-contacted support and base metal oxide and comminuting said aqueous slurry and depositing the comminuted slurry on said carrier by forming in a gaseous medium dispersed particles of said slurry and contacting said dispersed particles of slurry with said carrier to deposit said alumina support, base metal oxide and platinum group metal component on said carrier, and drying the resulting coated carrier particles to provide said catalyst composition.

10. A catalyst composition of claim 9 in which the stabilized alumina comprises ceria-alumina.

11. In a method of manufacturing a catalyst composition comprising depositing a catalytically-promoting material on a solid, macrosize, particulate carrier, said catalytically-promoting material comprising a base metal component containing one or more catalytically-promoting members selected from the group consisting of base metals having an atomic number from 25 to 28 and rhenium, a catalytically-promoting platinum group metal component and an alumina support, the steps which comprise combining said platinum group metal component, said base metal component, and said alumina support on said carrier, said platinum group metal component being combined with said support by contacting said support in solid, finely divided form with a liquid containing therein a compound of at least one platinum group metal, and said base metal component being combined with said support by at least one of (1) admixing finely divided particles of a solid compound of at least one base metal with said solid, finely divided alumina support and (2) contacting said support with a liquid containing therein a compound of at least one base metal, which liquid may be the same or different from that which contains said compound of said platinum group metal, heating said alumina support, after the aforesaid contacting with said liquid or liquids containing said platinum group metal and, optionally, said base metal compound or compounds, at a temperature sufficiently high to provide thereon said platinum group metal component and, optionally, said base metal component, forming a mixture of said solid, finely divided alumina support and a liquid, forming in a gaseous medium dispersed particles of said mixture containing liquid and said alumina support, and contacting said dispersed particles with said solid, macrosize particulate carrier, said carrier comprising particles having a surface area of at least about 50 square meters per gram, to deposit said alumina support on said carrier, and drying the resulting particulate carrier coated with said alumina support component.

12. A method of claim 11 in which at least one platinum group metal component or base metal component is in said dispersed mixture when it is contacted with said macrosize carrier.

13. A method of claim 12 in which the platinum group metal comprises one or both of platinum and palladium, and one or more of rhodium, ruthenium and iridium.

14. A method of claim 13 in which platinum comprises the major amount of the platinum group metal.

15. A method of claim 14 in which said platinum group metal comprises platinum and rhodium and said base metal component comprises one or more nickel, cobalt and manganese oxide components.

16. A method of claim 11 in which said dispersed particles contain platinum group metal and base metal components and the latter is in finely-divided, solid form.

17. A method of claim 11 in which said carrier particles are disposed as a compact bed when contacting said dispersed particles.

18. In a method of manufacturing a catalyst composition comprising depositing a catalytically-promoting material on a solid, macrosize, particulate, activated alumina carrier, said catalytically-promoting material comprising a base metal oxide comprising one or more of nickel, cobalt and manganese oxide, a platinum group metal component in which platinum comprises the major amount of platinum group metal, and a stabilized, activated alumina support, the steps which comprise combining a finely divided, solid alumina support with said platinum group metal component and said base metal oxide to provide a composite thereof by contacting said support with a liquid containing therein at least one compound of a platinum group metal, essentially including a compound of platinum, in an amount such that platinum is the major amount of platinum group metal, heating said alumina support, after the aforesaid contacting with said liquid containing therein said at least one compound, at a temperature sufficiently high to provide thereon said platinum group metal component, admixing finely divided solid particles of said base metal oxide with said finely divided solid particles of said alumina support and forming in air dispersed particles of an aqueous mixture containing said composite of said alumina support, said platinum group metal compound and base metal oxide, and contacting the dispersed particles with a compact bed of said macrosize, solid carrier particles having a surface area of at least about 75 square meters per gram, and drying resulting particulate carrier coated with the solids of said dispersed particles.

19. A method of claim 18 in which said dispersed particles are an aqueous, comminuted mixture in which said base metal component is in finely-divided, solid form.

20. A method of claim 19 in which said platinum group metal comprises one or both of platinum and palladium, and one or more of rhodium, ruthenium and iridium.

21. A method of claim 20 in which said platinum group metal comprises rhodium and platinum.

22. The method of claim 1 wherein said heating and said drying of said support are carried out after the contacting of said support with said liquid or liquids and the depositing of the resultant contacted support and, optionally, said solid finely-divided base metal component on said carrier.

23. The method of claim 22 wherein said heating is carried out at a temperature of at least about 250° C.

24. The method of claim 5 wherein said heating and said drying of said support are carried out after the contacting of said support with said liquid or liquids and the depositing of the resultant contacted support and, optionally, said solid finely-divided base metal component on said carrier.

25. The method of claim 24 wherein said heating is carried out at a temperature of at least about 250° C.

26. The method of claim 9 wherein said heating and drying of said support are carried out after said support is combined with said liquid containing said compounds of rhodium and platinum and the depositing of the resultant contacted support and said solid finely-divided base metal component on said carrier.

27. The method of claim 26 wherein said heating is carried out at a temperature of at least about 250° C.

28. The method of claim 11 wherein said heating and said drying of said support are carried out after the contacting of said support with said liquid or liquids and the depositing of the resultant contacted support and, optionally, said solid finely-divided base metal component on said carrier.

29. The method of claim 28 wherein said heating is carried out at a temperature of at least about 250° C.

30. The method of claim 18 wherein said heating and said drying of said support are carried out after the contacting of said support with said liquid containing said compound of a platinum group metal and the depositing of the resultant contacted support and said solid finely divided base metal component on said carrier.

31. The method of claim 30 wherein said heating is carried out at a temperature of at least about 250° C.

* * * * *